(12) United States Patent
Porter

(10) Patent No.: US 6,695,172 B1
(45) Date of Patent: Feb. 24, 2004

(54) PAINT MARKING, HOLE FORMING AND FLAG INSERTION DEVICE

(76) Inventor: Steven P. Porter, 0 S 687 Autumn Woods La., Elburn, IL (US) 60119

( * ) Notice: Subject to any disclaimer, the term of this patent is extended or adjusted under 35 U.S.C. 154(b) by 0 days.

(21) Appl. No.: 10/253,153

(22) Filed: Sep. 24, 2002

(51) Int. Cl.[7] .................................................. B67D 5/64
(52) U.S. Cl. ...................................... 222/174; 222/191
(58) Field of Search ................................ 222/174, 191, 222/192, 402.15

(56) References Cited

U.S. PATENT DOCUMENTS 5,769,279 A * 6/1998 Smrt .......................... 222/174
5,918,565 A * 7/1999 Casas ......................... 116/211

* cited by examiner

Primary Examiner—Philippe Derakshani
(74) Attorney, Agent, or Firm—William S. Grabarek

(57) ABSTRACT

A combination paint marking, hole forming and flag insertion device for surface marking and flagging the path of underground utilities.

5 Claims, 4 Drawing Sheets

PAINT MARKING, HOLE FORMING AND FLAG INSERTION DEVICE

The present invention relates to a combination paint marking, hole forming and flag insertion device for surface marking and flagging the path of underground utilities.

BACKGROUND OF THE INVENTION

The surface marking and flagging of the path of underground utility lines generally requires a three step procedure. An aerosol spray paint is first used to spray a brightly colored paint or other marking composition spaced along and onto the surface of the ground overlying the underground utility. A hole is then bored into the so marked soil subsurface using a spike or other pointed instrument, after which a flag is manually inserted into the newly formed hole. Such a procedure is cumbersome and generally has required two tools: one tool for applying the paint or marking composition and another tool for boring the hole. Lastly, a plastic or wire staff on which a small flag is mounted must be manually inserted into the newly formed hole. In tall grass, or highly vegetated or debris covered areas, it is often difficult to find the newly bored hole and, when found, the worker must bend over to insert the flag. Such repetitive bending motions often cause back strains, sprains and other injuries, with attendant lost time and medical expenses. Also, because the staff of the typical marking flag is generally of substantially smaller diameter than that of the newly bored hole, the flag, when inserted, may not be sufficiently secured within the hole, creating a risk of the flag being blown from the hole by strong winds or being inadvertently removed if someone brushes against it.

There are a number of devices in the prior art which have attempted to overcome some of the shortcomings of the procedure for marking and flagging the path of underground utility lines. U.S. Pat. No. 5,769,279, for example, describes an aerosol paint dispensing apparatus having flag staking capability by incorporating a spike or stake member used to create an opening or hole in the soil subsurface, after which the flag must be manually inserted into the hole. Similarly, U.S. Pat. No. 5,918,565 describes a device with like capabilities, but which still requires manual insertion of a flag into the newly formed hole.

SUMMARY OF THE INVENTION

It is one object of the present invention to overcome the above described shortcomings and allow the surface marking, hole boring and flag insertion for the marking of underground utilities to be carried out with a single device without the need to manually insert the marking flags into the ground. It is a further object of the invention to provide a device which after applying the marking paint, can bore a hole for a marking flag, and insert the flag without requiring the worker to bend over to manually insert the flag; as well as minimizing the risk of the flag being blown from the hole by winds, or of its inadvertent removal from the hole, as the flag staff, when inserted, is bent into a "v" or barbed configuration by the novel design of the boring tip of the present invention, and which barbed configuration provides desired holding tension for the flag staff within the hole. Should the soil subsurface be dry, or hard packed as often found in clay soils, an optional foot post may be incorporated into the device to allow the worker to exert additional downward force on the boring tip. In softer soils, only the force exerted on the handle by the worker is generally sufficient to bore a hole into which the marking flag can be inserted.

DETAILED DESCRIPTION OF THE INVENTION

In accordance with one preferred embodiment of the invention, there is provided a multiple function device for paint marking, hole forming and flag insertion useful for the surface marking of the path of underground utilities.

Figure 1:
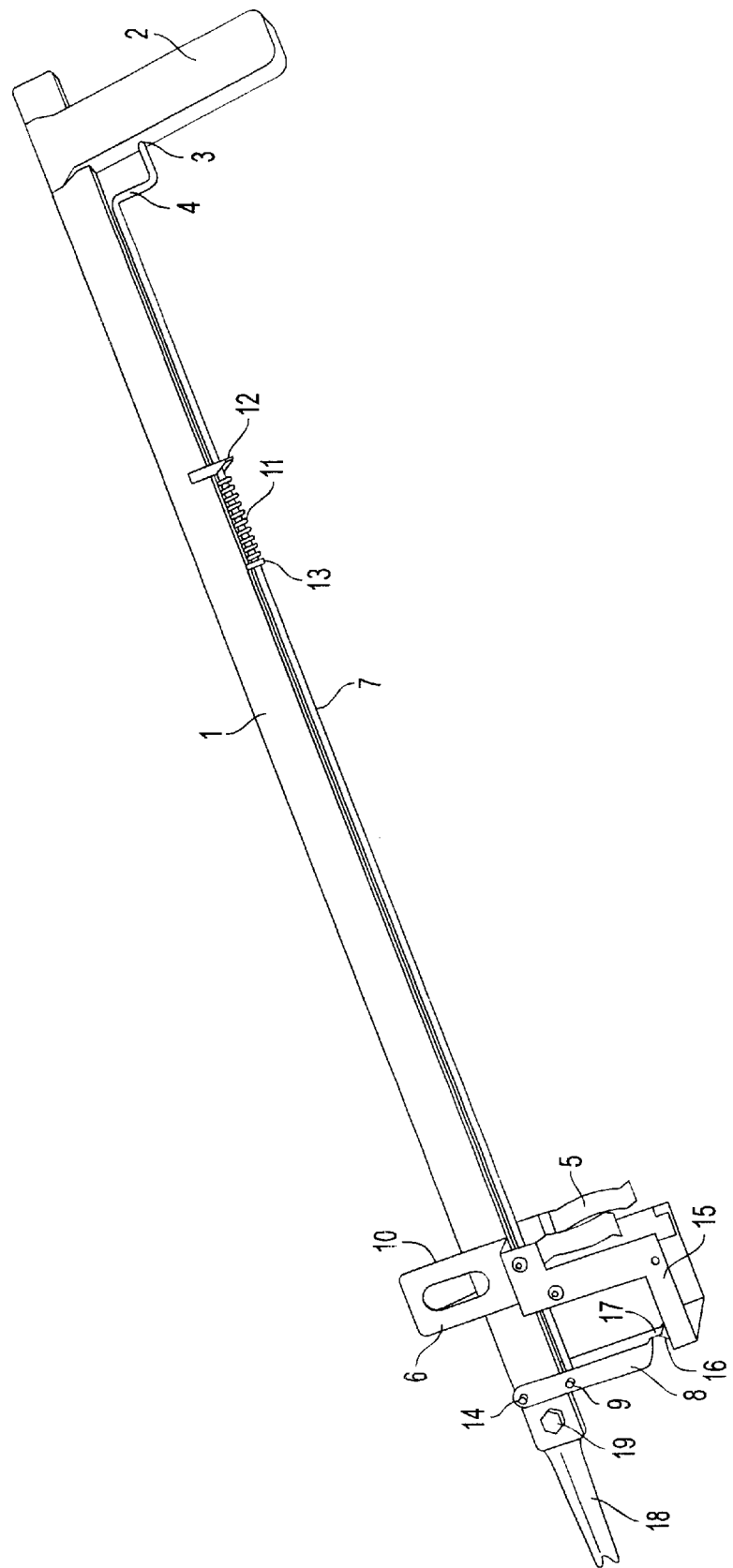
FIG. 1 is a perspective view of a combination paint marking, hole forming and flag insertion device constructed according to one preferred embodiment.

Referring to FIG. 1, there is illustrated a preferred embodiment of the invention. Mounted perpendicularly to one of the narrow sides, and toward one end, of a hollow, rectangular metal tube 1 is a handle means 2 in which said handle means, and facing the distal end of the tube 1, is a round hole or opening 3 of a diameter sufficiently larger than the diameter of the rod 7 forming the remote valve actuating trigger 4 so as to provide non-binding axial movement of the trigger 4 when it is squeezed and which hole also serves as a support for a terminus end of rod 7. The handle means preferably should be fabricated from sheet metal with rounded edges to allow for a comfortable and safe grip for the worker. The other end of rod 7 is attached to lever yoke 8 through a round hole 9 in one side arm of lever yoke 8 by forming a 90 degree angle at the end of rod 7 perpendicular to hole 9 and of a length sufficient to pass through and beyond hole 9 and, when so connected to the lever yoke 8, allows the worker to actuate the valve of the aerosol paint can by squeezing the trigger 4 which, upon actuation, sprays paint between and through the arms of lever yoke 8, thereby marking the soil surface for flag placement. The aerosol paint can is held by spring steel clips 5 attached to the inner faces of mounting plates 6 with rivets through the bases of said clips. The spring steel clips 5 are curved or arcate so as to mate with and firmly grip the outer wall of the aerosol spray paint can when said can is inserted between the spring steel clips 5 with the valve of the aerosol spray paint can pointing outward.

The ends of mounting plates 6 extending beyond the hollow, rectangular metal tube 1, and opposite of the portion of the mounting plates 6 onto which spring steel clips 5 are mounted, are welded together and, when so welded together, form a foot post 10, said foot post being useful for providing additional pressure on the boring tip in dry or hard packed clay soils.

The spring steel clips 5 should be of such thickness and hardness as to provide sufficient tension on the surface of the aerosol spray paint can as to hold it in place without movement when the can's aerosol spray valve is actuated by squeezing the trigger 4. To reduce flexing of rod 7 and provide for a backing plate for the trigger return coil spring 11 through which rod 7 passes, a bracket 12 is mounted on said tube 1, said bracket 7 having a slot through the inner face thereof and through which rod 7 passes. To maintain the position of the trigger return coil spring 11 in an uncompressed state, and provide the necessary compression of said coil spring when the trigger 4 is squeezed, a washer 13, having an inside diameter slightly larger than the outside diameter of the rod 7, is placed between the end of the coil spring 11 opposite the end of the coil spring resting against the inner face of bracket 12 and nibs or projections formed in rod 7 to prevent the washer 13 from sliding on rod 7 when pressure is applied to the trigger return coil spring 11. Mounting of the handle means 2, mounting plates 6, and bracket 12 to tube 1; and mounting of reinforcing yoke 15 to mounting plates 6, is preferably by welding, though mechanical fastening devices, such as rivets, or adhesives could be employed. The choice of these and other mounting methods and materials would be apparent to one skilled in the art.

Figure 2:
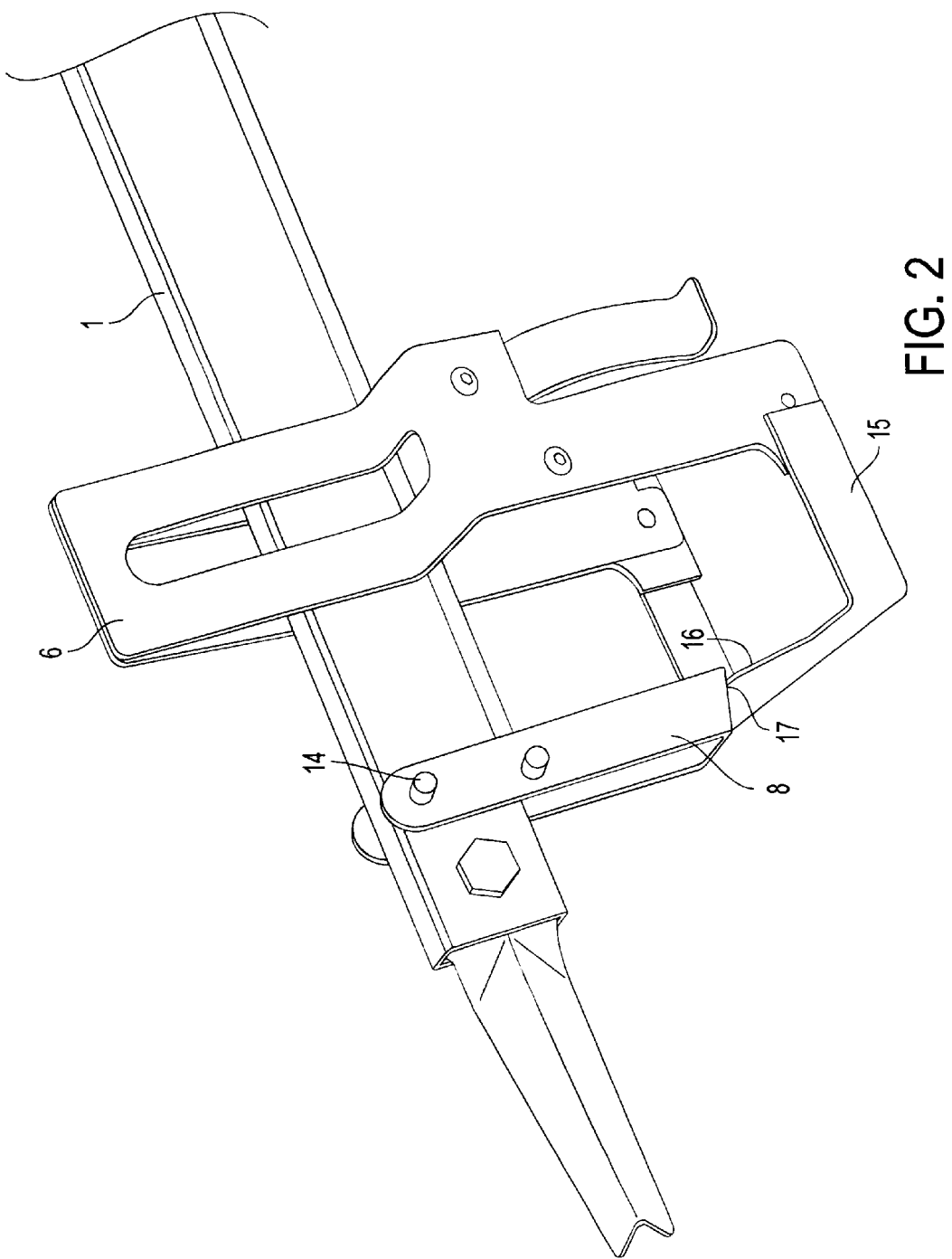
FIG. 2 is a perspective view of the forward end of a combination paint marking, hole forming and flag insertion device constructed according to one preferred embodiment.

Referring to FIG. 2, the lever yoke 8 is pivotally mounted on tube 1 on pivot pin 14 passing through preformed parallel holes in both arms of lever yoke 8 and tube 1. Additionally, to limit forward movement of said lever yoke 8 beyond the forward edge of reinforcing yoke 15 joining the mounting plates 6, a tab 17 extends perpendicularly downward from the cross member of lever yoke 8 and inside and beyond a like tab 16 extending upward from the cross member of said reinforcing yoke 15 joining mounting plates 6.

A preferred embodiment of the hole forming and flag insertion means of the invention is shown in FIG. 2 as a two pointed blade 18 held firmly in the end of tube 1 with a threaded bolt 19. Securing said blade 18 within the tube 1 with a threaded bolt 19 allows for ready removal and replacement or reversal of the blade, as well as for substitution of blades having different shank or blade lengths, sizes or designs, including tapered tubular spikes having a shallow single grove or intersecting rounded grooves over and across a truncated spike point.

Figure 3:
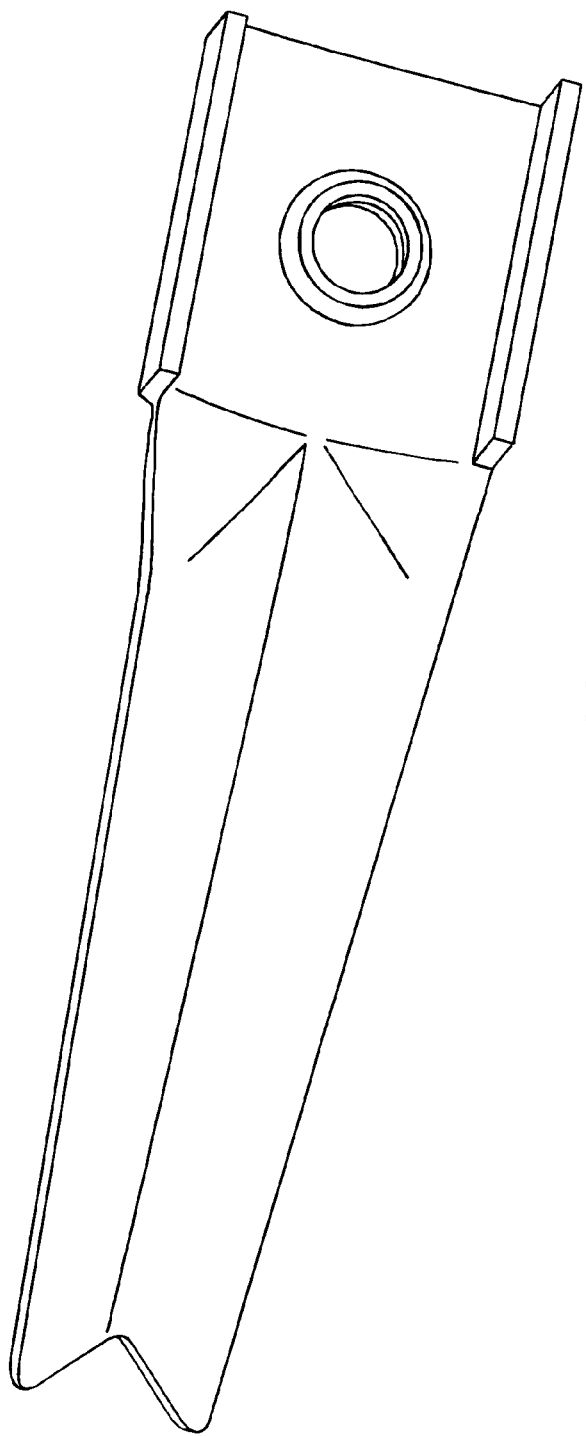
FIG. 3 is a perspective view of one embodiment of a hole forming and flag insertion tip.
Figure 4:
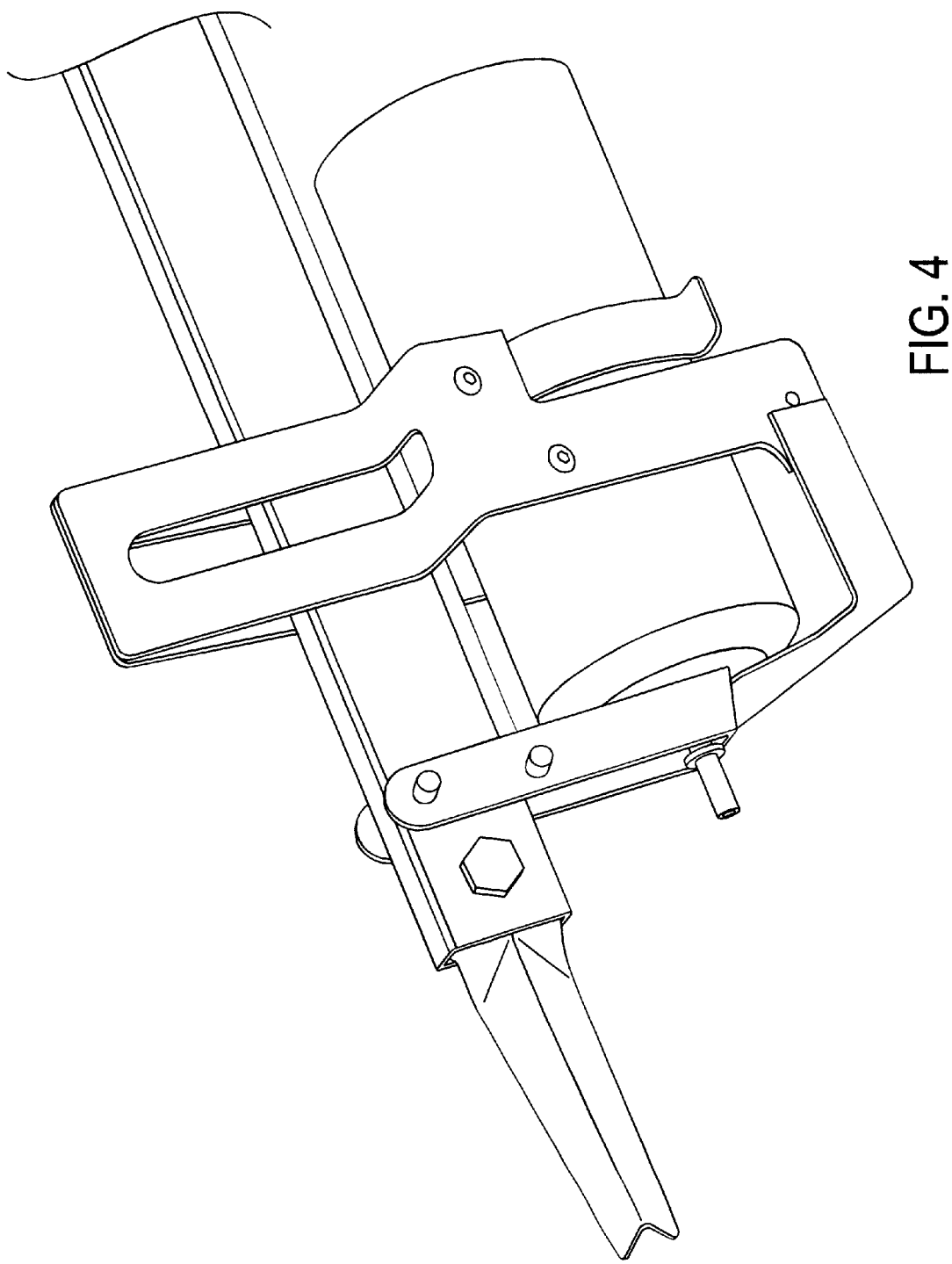
FIG. 4 is a perspective view of the forward end of a combination paint marking, hole forming and flag insertion device constructed according to one preferred embodiment and having an aerosol paint can firmly clamped within the spring steel clips.

FIG. 3 more fully illustrates the configuration of one preferred embodiment of a two pointed blade having a threaded hole in the shank to allow securing the blade within tube 1 with threaded bolt 19. During or after fabrication of the two pointed blade, however, the point of intersection of the two inner edges of the two pointed blade should be sufficiently rounded by grinding said edges, or burnishing said edges, to prevent cutting or breaking of the marking flag's staff during its insertion into the soil subsurface. A preferred angle of intersection of the inner edges of the two pointed blade is 90 degrees or more, as too acute an angle could cause the marking flag's staff to bind in the blade. The blade is preferably constructed of hardened steel with a shank length of one inch or more and a blade length of two and one-half inches or more. Additional rigidity can be imparted to the blade portion during fabrication by forming a thirty degree crease angle along the longitudinal centerline of the blade.

As the blade employs two points for boring a hole into the soil subsurface, the staff of a marking flag can be pushed into the subsurface, either simultaneously with the boring of said hole or after said hole is bored, by placing said staff between the two points of the blade, approximately one inch to one and one and one-half inches above the end of the staff opposite the flag end, and exerting downward pressure on the blade. The pressure thus exerted will cause the staff to deform into a "v", forming a barbed configuration which, when forced down into the subsurface, will provide increased holding tension, making the flag more difficult to be removed by either strong winds or someone inadvertently brushing against it. When inserting marking flags in tall or heavy vegetation or where it may otherwise be difficult to lay the flag staff flat upon the ground for ease of insertion using the mounted two pointed blade, the worker may first manually bend the end of the staff opposite the flag end into a "v" approximately one inch to one and one half inches or more back from such end and then place the so bent flag staff on the ground or vegetation, thereby enabling the two pointed blade to easily catch the "v" of the flag staff between the two points of the blade and so push the flag staff through the vegetation or debris and into the soil subsurface. Alternatively, the worker can "hook" the "v" of the so bent flag staff between the points of the two pointed blade and, while holding the top of the flag staff against tube 1, guide the flag staff through the vegetation and push it into the soil subsurface. When inserting the flag staff into the soil subsurface, the free end of the flag staff should be below the soil surface.

While tube 1 of FIG. 1 and FIG. 2 is metal, rectangular in cross section and hollow, having a length of approximately thirty inches; other cross sectional shapes and non-metallic materials, both hollow and solid, and of longer or shorter lengths, are acceptable alternatives, limited only by, amongst other considerations, manufacturing complexity and costs and the desired weight and durability of the finished device. It is recommended that the handle end of the tube, however, not be capped or otherwise sealed, as such open end can serve as a quiver or container to hold a quantity of marking flags.

While the present invention has been illustrated by the description of the preferred embodiments, it is not the intention of the applicant to in any way limit the scope of the appended claims. Additional modifications and advantages will be readily apparent to one skilled in the art. Therefore, the invention's scope is not to be limited to the specific described embodiments.

What is claimed is:

1. A combination paint marking, hole forming and flag insertion device comprising:

a tube member, a handle mounted at one end of said tube member, an aerosol spray paint can holder means and an aerosol valve actuating means mounted at the opposite end of said tube member, a trigger control means for actuating the valve of an aerosol spray paint can, said trigger control means engaged with said handle, a connecting means attached to said trigger control means and said aerosol valve actuating means, a foot post opposite to the holder means for the aerosol spray paint can, and a hole forming and flag insertion means extending from the said opposite end of said tube member.

2. The combination of claim 1 wherein the tube member is a hollow rectangular metal tube.

3. The combination of claim 1 wherein the hole forming and flag insertion means is a two pointed blade.

4. A combination paint marking, hole forming and flag insertion device comprising:

a hollow rectangular metal tube member, having mounted at one end of said tube member, a handle and trigger control for actuating the valve of an aerosol spray paint can, and having mounted at the opposite end of said tube member, a spring steel holder for an aerosol spray paint can, an aerosol valve actuating means, a foot post opposite to said spring steel holder for an aerosol spray paint can, and a two pointed blade for hole forming and flag insertion extending from the said end of said tube member, and a connecting means attached to said trigger control means and said aerosol valve actuating means.

5. A method for the surface marking and flagging of the path of underground utilities using a combination paint marking, hole forming and flag insertion device, said device comprising:

a tube member, a handle mounted at one end of said tube member, an aerosol spray paint can holder means and an aerosol valve actuating means mounted at the opposite end of said tube member, a trigger control means for actuating the valve of an aerosol spray paint can, said trigger control means engaged with said handle, a connecting means attached to said trigger control means and said aerosol valve actuating means, a foot post opposite to the holder means for the aerosol spray paint can, and a hole forming and flag insertion means extending from the said opposite end of said tube member.

* * * * *